United States Patent [19]

Blundell et al.

[11] Patent Number: 4,499,256

[45] Date of Patent: Feb. 12, 1985

[54] ANISOTROPIC POLYESTERAMIDE POLYMERS HAVING IMPROVED RETENTION OF PHYSICAL PROPERTIES AT ELEVATED TEMPERATURES AND METHODS OF MANUFACTURE THEREOF

[75] Inventors: David J. Blundell, Welwyn Garden City; Brian P. Griffin, St. Albans; William A. MacDonald, Ware, all of England

[73] Assignee: Imperial Chemical Industries PLC, London, England

[21] Appl. No.: 438,730

[22] Filed: Nov. 3, 1982

[30] Foreign Application Priority Data

Nov. 16, 1981 [GB] United Kingdom ............... 8134511
Nov. 16, 1981 [GB] United Kingdom ............... 8134512

[51] Int. Cl.³ ............................................. C08G 69/44
[52] U.S. Cl. .................................. 528/172; 528/173; 528/183; 528/184; 528/185; 528/190; 528/193; 528/194
[58] Field of Search ............... 528/173, 172, 185, 190, 528/193, 194, 183, 184

[56] References Cited

U.S. PATENT DOCUMENTS

| | | | |
|---|---|---|---|
| 4,299,756 | 11/1981 | Calundann | 528/173 |
| 4,330,457 | 5/1982 | East et al. | 528/190 |
| 4,339,375 | 7/1982 | Calundann et al. | 528/185 |
| 4,341,688 | 7/1982 | Charbonneau et al. | 528/185 |
| 4,351,917 | 9/1982 | Calundann et al. | 528/185 |
| 4,351,918 | 9/1982 | Charbonneau et al. | 528/185 |
| 4,355,132 | 10/1982 | East et al. | 528/185 |
| 4,355,133 | 10/1982 | East et al. | 528/173 |
| 4,398,019 | 8/1983 | Cox et al. | 528/190 |

*Primary Examiner*—Lester L. Lee
*Attorney, Agent, or Firm*—Cushman, Darby & Cushman

[57] ABSTRACT

An anisotropic-melt-forming polymer having improved stiffness retention at elevated temperatures comprising residues selected from residues (A) of dihydric phenols, aromatic dicarboxylic acids, hydroxyaromatic acids, aromatic diamines, aminophenols and aminoaromatic acids wherein at least 40 mole % of the residues (A) have their chain extending bonds in either coaxial or parallel and oppositely directed relationship and sufficient of non-linear residues (B) selected from at least one of:

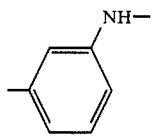

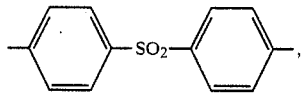

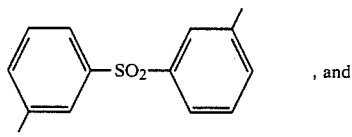

, and

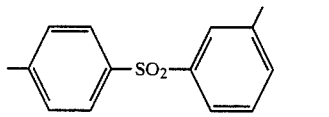

to give a polymer having an improved retention of stiffness at elevated temperature compared with an otherwise similar polymer not containing said residues (B).

11 Claims, No Drawings

ANISOTROPIC POLYESTERAMIDE POLYMERS HAVING IMPROVED RETENTION OF PHYSICAL PROPERTIES AT ELEVATED TEMPERATURES AND METHODS OF MANUFACTURE THEREOF

This invention relates to thermotropic aromatic polyesteramides.

In recent years there has been a good deal of interest in polymers which are able to exhibit an anisotropic melt phase. Such polymers have been extensively described in the literature and patent publications. In general the polymers in question have been prepared from reactants which give rise to high strength, high stiffness materials. It has now been observed that the high stiffness of some of these materials can deteriorate at elevated temperatures to the point where the product is no stiffer than conventional thermoplastics, such as polyethylene or polypropylene. It has now been found possible to retain a higher stiffness at elevated temperatures by modification of the polymer composition.

Accordingly there is provided an anisotropic-melt-forming polymer having improved stiffness retention at elevated temperatures comprising residues selected from residues (A) of dihydric phenols, aromatic dicarboxylic acids, hydroxyaromatic acids, aromatic diamines, aminophenols and aminoaromatic acids wherein at least 40 mole % of the residues (A) have their chain extending bonds in either coaxial or parallel and oppositely directed relationship and sufficient of non-linear residues (B) selected from at least one of:

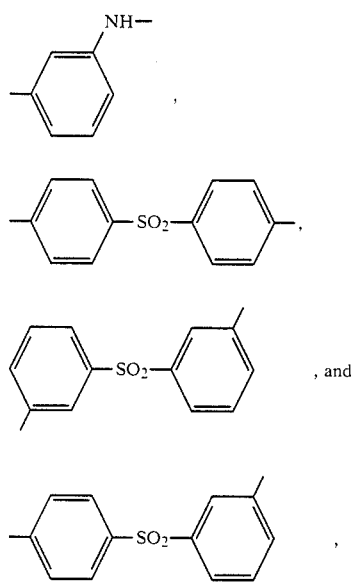

to give a polymer having an improved retention of stiffness at elevated temperature compared with an otherwise similar polymer not containing said residues (B).

In general, at least 5 mole % of the non-linear residues are required to produce a significant improvement in stiffness retention. As the concentration approaches 50 mole % it is generally more difficult because of excessive chain disruption to obtain anisotropic melts. The preferred range of concentration is between 10 and 40 mole %.

Surprisingly the stiffness of such polymers is maintained at higher temperatures than similar compositions which do not contain the specified non-linear residues.

The principles involved in disrupting the chain regularity of intractable para-linked aromatic polymers so that they exhibit anisotropic melts below the decomposition temperature and can be processed in fluid yet ordered states are now well established. These principles are discussed, for example, by B P Griffin and M K Cox in The British Polymer Journal, December 1980, pages 147 to 153. This article is particularly directed to bringing about the required disruption using non-linear units. The use of meta- and ortho-diacids and dihydric phenols is shown to accomplish disruption effectively, giving rise to fluid anisotropic melts. However, as indicated above the resulting products, can be defective in their retention of stiffness at elevated temperatures.

It has now been recognized that this loss in stiffness with increasing temperature can be prevented to some extent by choice of the non-linear unit employed.

Typical condensation polymers which form anisotropic melts are described in U.S. Pat. Nos. 3,991,013, 3,991,014, 4,057,597, 4,066,620, 4,067,852, 4,075,262, 4,083,829, 4,118,372, 4,130,545, 4,130,702, 4,156,070, 4,159,365, 4,161,470, 4,169,933, 4,181,792, 4,184,996 and 4,330,457. The latter discloses polyesteramides capable of forming an anisotropic melt phase derived from 6-hydroxy-2-naphthoic acid, aromatic dicarboxylic acids and an aromatic monomer capable of forming an amide linkage. Although amongst the list of suitable amide linkage-forming monomers there is listed m-aminophenol no composition containing this monomer is exemplified nor is there any recognition that such a composition would be particularly desirable in having superior retention of stiffness at elevated temperatures. Similarly, in a list of diols which may optionally be included there is listed a dioxyaryl moiety of formula:

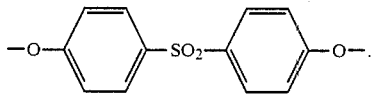

This is neither exemplified nor recognised as being a particularly desirable constituent for providing superior retention of stiffness at elevated temperatures.

U.S. Pat. No. 3,598,864 discloses polyesteramides formed from aromatic dicarboxylic acids, bisphenols and reactants giving the bivalent radical:

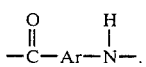

The latter reactants include meta-aminobenzoic acid which is exemplified in Example III. This material does not form an anisotropic melt. Isotropic-melt-forming polymers such as disclosed in U.S. Pat. No. 3,598,864 do not in fact suffer from the serious loss in stiffness which appears to be a characteristic of anisotropic-melt-forming polymers.

In the present invention the non-linear in-chain groups of formula:

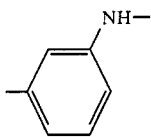

are suitably provided by the meta-directed aminophenols, aromatic diamines and aminoaromatic acids and their polymerisable derivatives. The meta-directed aminophenols, aromatic diamines and aminoaromatic acid are reactants of formula:

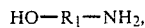

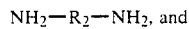

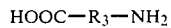

where $R_1$, $R_2$ and $R_3$, which may be the same or different, are selected from:

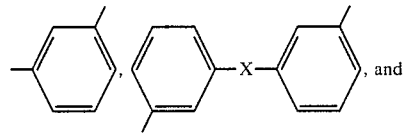

and

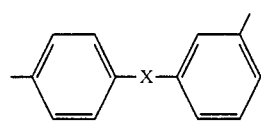

where X is a direct link or is selected from —O—, >CO, >CH$_2$, >SO$_2$, >C(CH$_3$)$_2$ or phenyl radicals, and an amino group is present in the meta position with respect to the other chain extending bond in the case of the single ring compounds and in the case of the multiple ring systems is in the meta position with respect to the outgoing bond linked to X or linked directly to the ring. It is preferred that the rings carry no substituents other than the chain extending groups.

Small quantities of reactants giving rise to the incorporation in the polymer chain of a group of formula:

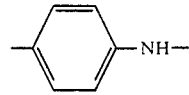

may be present but these are not as effective in preventing the fall in stiffness at elevated temperatures.

Suitable non-linear aminophenols and derivatives of aminophenols include m-aminophenol, 3-hydroxy, 3'-aminodiphenylsulphone and their derivatives.

Suitable non-linear aromatic diamines include m-phenylene diamine and its acetylated derivative and 3,3'-diamine diphenylsulphone.

Suitable non-linear amino aromatic acids include m-aminobenzoic acid and m-acetamido benzoic acid.

The sulphone-containing units are preferably derived from reactants of formula:

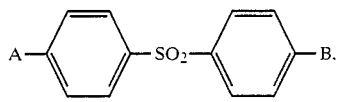

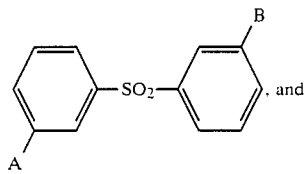

, and

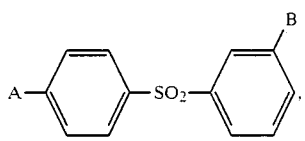

where A and B may be the same or different and are selected from —OH, —NH$_2$, —COOH, —Q—OH, —QNH$_2$ and —Q—COOH, where Q may be a phenyl radical or a radical of formula:

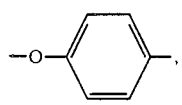

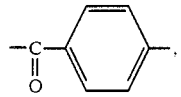

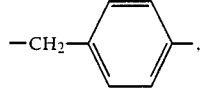

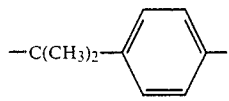

and polymerisable derivatives thereof. Suitable reactants are 4,4'-diaminodiphenyl sulphone, 3,3'-diaminodiphenylsulphone, bis-phenol-S and the acids of formula:

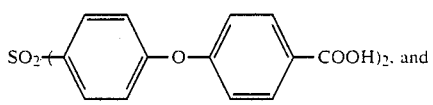

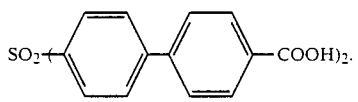

The co-reactants other than those providing the non-linear residues may be any of the aromatic dicarboxylic acids, diphenols, hydroxyaromatic acids, aromatic diamines, aminophenols and aminoaromatic acids or their derivatives which are capable of entering into polyester or polyesteramide forming reactions. Preferably they are any of the single 6-membered ring compounds having their chain extending bonds positioned 1,4- to each other, any of the fused 6-membered ring compounds in which the chain extending bonds are in positions parallel and oppositely directed and any of the multiple 6-membered ring compounds in which the rings are joined by a direct link or a bivalent radical of formula —O—, >CO, >CH₂, >SO₂, >C(CH₃)₂ or a phenyl radical, and the chain extending bonds of each ring are in the 1.4-position. It is preferred that these ring systems are unsubstituted although small quantities of substituted aromatic dicarboxylic acids, diphenols and hydroxy aromatic acids may be used. The substituent should be selected from halogen, phenyl and alkyl or alkoxy groups containing from 1 to 4 carbon atoms. Similarly small proportions of the aromatic dicarboxylic acids, diphenols and hydroxyaromatic acids may be present in which the chain extending bonds are neither in the 1,4-position nor are parallel and oppositely extending. For example, a small proportion of meta-linked forms of such compounds, other than those specified as the non-linear reactants, may be present.

Typically suitable aromatic dicarboxylic acids are terephthalic acid, 4,4'-bibenzoic acid, bis(p-carboxyphenyl)methane, ethylene bis-p-benzoic acid and 2,6-naphthalene dicarboxylic acid. Suitable phenols are hydroquinone, bisphenol A, and 4,4'-dihydroxybiphenyl. Suitable hydroxyaromatic acids are hydroxybenzoic acid and hydroxynaphthoic acid.

The non-linear reactants may be used to obtain the benefit of the invention in combination with any of the polyester or polyesteramide forming ingredients. For example, they can be used in combination with hydroxyaromatic acids, optionally together with aromatic dicarboxylic acids and/or diphenols. Alternatively, they can be used in combination with aromatic dicarboxylic acids and diphenols as the only other reactants. The invention also includes the methods of preparing the polymers of the invention.

The existence of an anisotropic melt may be determined using optical microscopy using cross polarisers. A suitable method is described in U.S. Pat. No. 4,118,372.

The degree of maintenance of stiffness with increasing temperature is readily determined by Dynamic Mechanical Analysis. The results detailed in this specification were determined using a Du Pont 981 Dynamic Mechanical Analyser (DMA) controlled by a Du Pont 990 Thermal Analyser.

Samples were compression moulded at a pressure of 15 tonnes on a 10 cm diameter ram in a mould about 25 mm×12 mm×1.5 mm thick by heating for 4 minutes to a temperature 30° C. above the temperature at which melt anisotropy is observed for the particular sample. This temperature is determined using the method described in U.S. Pat. No. 4,118,372. After heating for 4 minutes the sample is allowed to cool naturally in the press to room temperature.

After mounting in the instrument, the DMA was scanned at 10° C./min from −120° C. to the melting point of the sample. The signals recorded by the DMA were vibration frequency f (hz) and damping signal V (mV). These signals were converted to Young's modulus E' and Loss Modulus E'' by the following formulae:

$$E' = \frac{(4\pi^2 f^2 J - K)}{2W\left(\frac{L}{2} + D\right)^2} \frac{(L)^3}{(T)}$$

$$\tan \delta = \frac{CV}{f^2}$$

$$E'' = E' \tan \delta$$

where
W = sample width
L = sample length
T = sample thickness

J, K, D, V are instrumental factors which were determined according to the instruction measure of the instrument manufacturer.

Although the products of the invention may be fabricated into any shaped articles such as filaments and films the property of retention of stiffness at elevated temperature is particularly useful where the product is used for moulding shaped articles, particularly those which are likely to be subject to elevated temperatures in service use.

The polymers of the invention may be used to prepare compositions containing the auxiliary additives conventionally used in polymer technology, but in particular may contain additives which significantly alter the property of the polymer composition such as reinforcing and non-reinforcing fillers. Such fillers may be particulate, may have a platey structure or may be fibrous fillers and may be present over the concentration range 2 to 80% by weight of the composition.

The invention is further illustrated by reference to the following Examples.

EXAMPLE 1

A three-necked 100 ml flask provided with a stirrer, a nitrogen inlet and a cold trap was charged with acetoxynaphthoic acid (25.9 g, 0.113 mole), terephthalic acid (9.34 g, 0.0565 mole) and meta-acetoxyacetanilide (10.9 g, 0.0565 mole). After purging the flask with nitrogen for 30 minutes the flask was lowered into a metal bath preheated to 240° C. The stirrer was started and the temperature of the bath raised to 280° C. At 260°–270° C. acetic acid began to distill off. The melt was stirred at 270°–290° C. for 40 minutes and then at 300° C. for 20 minutes until 95% of the theoretical quantity of acetic acid had been evolved. A vacuum of 3 mm Hg was applied to the melt at 300°–310° C. for a further 2 hours, during which time the viscosity of the melt increased. The melt was allowed to cool under vacuum. The product exhibited an optically anisotropic melt at 260° C. and at temperatures up to at least 400° C. The DMA stiffness was determined as previously described. A value of 4.9 GPa was obtained at 0° C. 50% of this value was still retained when the temperature was increased to 145° C., with 25% of the value being retained at 180° C.

COMPARATIVE EXAMPLE A

The procedure of Example 1 was repeated but with the meta-acetoxyacetanilide replaced by an equivalent quantity of resorcinoldiacaetate. A product exhibiting an anisotropic melt in the range 215° C. to greater than 400° C. was obtained. The Dynamic Mechanical Analysis showed a 50% reduction in DMA stiffness at a temperature of 110° C. and a 75% drop at a temperature of 135° C., both compared with the DMA stiffness at 0° C.

COMPARATIVE EXAMPLE B

The procedure of Example 1 was repeated except in that the meta-acetoxyacetanilide was replaced by an equivalent molar quantity of p-acetoxyacetanilide. A polymer was obtained which exhibited an anisotropic melt over the range 280° C. to greater than 400° C. Dynamic Mechanical Analysis showed a 50% reduction in DMA stiffness at 105° C. and a 75% reduction at 140° C.

EXAMPLE 2

The general procedure of Example 1 was used to prepare a polymer from p-acetoxy benzoic acid (0.12 mole), acetoxynaphthoic acid (0.0675 mole) and meta-acetamidobenzoic acid (0.0625 mole). The polymer obtained exhibited an anisotropic melt over the range 285° C. to greater than 400° C. The Dynamic Mechanical Modulus showed a 50% reduction at a temperature of 120° C. and a 75% reduction at 150° C.

COMPARATIVE EXAMPLE C

The general procedure of Example 1 was followed to prepare a polymer from p-acetoxy benzoic acid (0.12 mole), acetoxy naphthoic acid (0.0675 mole) and m-acetoxy benzoic acid (0.0625 mole). The polymer obtained exhibited an anisotropic melt over the range 240° C. to greater than 400° C. The temperatures observed by Dynamic Mechanical Analysis for 50% and 25% retention of the DMA stiffness at 0° C. were 100° C. and 115° C. respectively.

EXAMPLE 3

A polyesteramide was produced according to the procedure of Example 1 from acetoxynaphthoic acid (1.72 mole), meta-acetoxyacetanilide (0.57 mole) and terephthalic acid (0.57 mole). The polymer exhibited an anisotropic melt. DMA analysis showed the material had retained 50% of its stiffness at 126° C. and 25% at 163° C. The polymer was injection moulded into test pieces for measurement of flexural modulus, tensile strength and impact strength. The values obtained are listed below:

| Flexural Modulus (GPa) | | | Tensile Strength (MPa) | Impact Strength (Nm) | |
|---|---|---|---|---|---|
| Bar | Disc 0° | 90° | | Crack | Failure |
| 15.3 | 10.0 | 3.4 | 162 | 0.6 | 2.0 |

EXAMPLE 4

The general procedure of Example 1 was used to prepare a polyesteramide from chlorohydroquinone diacetate (0.175 mole), meta-acetoxyacetanilide (0.075 mole), bis(4-phenyleneoxy)ethylene dicarboxylic acid (0.075 mole) and terephthalic acid (0.175 mole) except in that the reaction temperature was not allowed to rise above 300° C. A polymer was obtained exhibiting an anisotropic melt between 250° C. and at least 400° C. The polymer showed a loss in stiffness of 50% at 120° C. and loss of 75% at 135° C.

COMPARATIVE EXAMPLE D

The procedure of Example 4 was used to produce a polyester from chlorohydroquinone diacetate (0.125 mole), bis(4-phenyleneoxy)ethylene dicarboxylic acid (0.0625 mole) and terephthalic acid (0.0625 mole). The polymer exhibited an anisotropic melt at a temperature of 240° C. which was still observed when the temperature was raised to 400° C. The DMA stiffness behaviour with respect to temperature was measured and showed a 50% reduction at 85° C. and a 75% reduction at 110° C.

EXAMPLE 5

The procedure of Example 4 was followed to produce a polyesteramide from chlorohydroquinone diacetate (0.125 mole) meta-acetoxyacetanilide (0.075 mole), dicarboxydiphenyl ether (0.075 mole) and terephthalic acid (0.175 mole). The polymer exhibited an anisotropic melt above 250° C. and at least up to 400° C. DMA analysis showed a 50% retention in stiffness at 133° C. and a 25% retention at 148° C.

COMPARATIVE EXAMPLE E

A polyester was prepared according to the general procedure of Example 4 from chlorohydroquinone diacetate (0.125 mole), dicarboxydiphenyl ether (0.0625 mole) and terephthalic acid (0.0625 mole). The polymer exhibited an anisotropic melt between 250° C. and at least 400° C. The DMA analysis showed that the polymer had lost 50% of its stiffness value at 108° C. and 75% at 150° C.

EXAMPLE 6

A 100 ml three necked flask equipped with a stirrer, $N_2$ inlet and cold trap was charged with acetoxy naphthoic acid (19.4 g, 0.084 mole), terephthalic acid (7 g, 0.042 mole) and 3,3'-diacetamidodiphenyl sulphone (14 g, 0.042 mole). After purging the flask with $N_2$ for 30 minutes the flask was lowered into a bath preheated to 220° C. The stirrer was started, the solid melted at 250° C. and a distillate was evolved at 260°-270° C. The melt was stirred at 270° C. for 30 minutes and then at 310° C. for a further 30 minutes. When no more distillate was evolved the melt was stirred at 300°-310° C. under a vacuum of 3 mm Hg for 90 minutes. The melt solidified during this period. The polymer was allowed to cool under vacuum. The polymer produced was found to exhibit an anisotropic melt above 290° C. and at least up to 400° C. Dynamic Mechanical Analysis indicated a DMA stiffness value of 5.3 GPa at 0° C. This value had fallen by 50% when the temperature reached 205° C. 25% of the initial stiffness was still retained at 230° C.

A polymer having a composition differing from the above in that the molar concentration of the sulphone-containing reactant and the terephthalic acid were both dropped from 25% to 15% of the composition, the molar concentration of the hydroxynaphthoic acid being increased to 70%. The product exhibited an anisotropic melt above 290° C. The temperatures at which 50% and 25% of the DMA stiffness value at 0° C. were retained were 145° C. and 200° C. respectively.

EXAMPLE 7

The general procedure of Example 6 was followed to prepare polymers having the following molar formula:

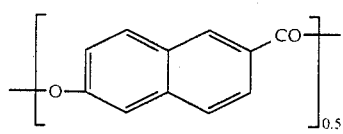 (A)

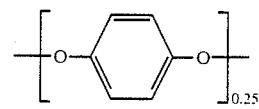

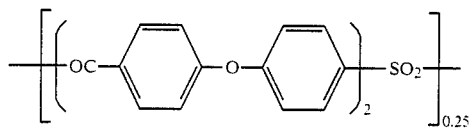

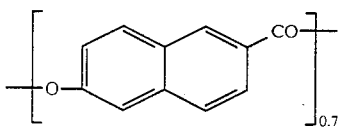 (B)

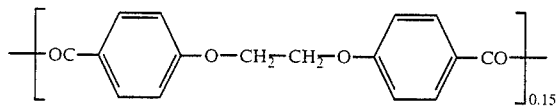

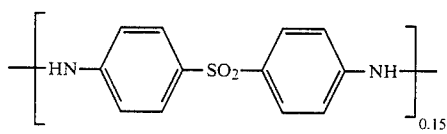

Polymer A exhibited an anisotropic melt above 210° C. which was retained up to at least 400° C. The temperatures at which 50% and 25% of the DMA stiffness value at 0° C. were retained were 148° C. and 162° C. respectively.

Although polymer B had a relatively low DMA stiffness at 0° C. (1.6 GPa) it showed good retention of DMA stiffness, 50% of the initial value being retained at 120° C. and 25% at 180° C.

EXAMPLE 8

The procedure of Example 6 was used to prepare a polyester from acetoxynaphthoic acid (0.6 mole), terephthalic acid (0.2 mole) and bisphenol-S (0.2 mole). The polymer exhibited an anisotropic melt.

The DMA analysis showed a 50% retention of stiffness at 130° C. and a 25% retention at 156° C.

We claim:

1. An anisotropic-melt-forming polyesteramide having improved stiffness retention at elevated temperatures prepared by reacting together reactants selected from (a) dihydric phenols, aromatic dicarboxylic acids, hydroxyaromatic acids, aromatic diamines, aminophenols and aminoaromatic acids and their polyesteramide forming derivatives wherein at least 40 mole % of the reactants (A) have their chain extending bonds in either coaxial or parallel and oppositely directed relationship and sufficient of non-linear reactants (B) selected from reactants containing at least one radical of formula

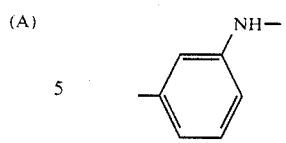

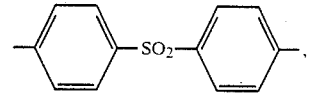

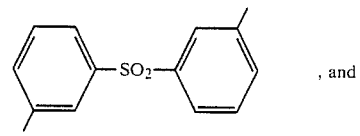, and

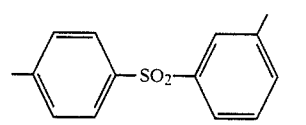, to give a polymer having an improved retention of stiffness at elevated temperatures compared with an otherwise similar polymer not prepared from reactants including said reactants (B).

2. An anisotropic-melt-forming polymer according to claim 1 wherein the concentration of non-linear reactants (B) is between 5 and 50 mole %.

3. An anisotropic-melt-forming polymer according to claim 2 wherein the concentration of non-linear reactants (B) is between 10 and 40 mole %.

4. An anisotropic-melt-forming polymer according to claims 1, 2 or 3 wherein the reactants other than the non-linear reactants are hydroxyaromatic acids and optionally, aromatic dicarboxylic acids and/or diphenols the reactants other than the non-linear reactants having their chain extending bonds in either coaxial or parallel and oppositely directed relationship.

5. An anisotropic-melt-forming polymer according to claims 1, 2 or 3 wherein the reactants other than the non-linear residues are aromatic dicarboxylic acids and diphenols.

6. A method of producing an anisotropic-melt-forming polymer having improved stiffness retention at elevated temperatures comprising reacting at least 40 mole % of polyesteramide forming reactants selected from dihydric phenols, aromatic dicarboxylic acids, hydroxyaromatic acids, aromatic diamines, aminophenols and aminoaromatic acids having their chain extending bonds in either coaxial or parallel and oppositely directed relationship with sufficient non-linear reactants selected from those containing the divalent radicals:

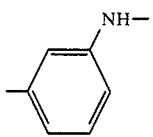

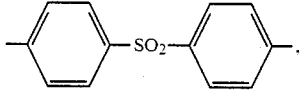

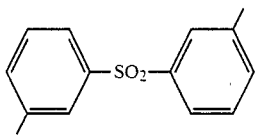, and

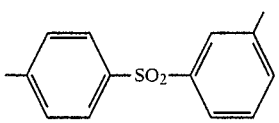, to give a polymer of improved retention of stiffness at elevated temperatures compared with an otherwise similar polymer not containing the non-linear reactants.

7. A method according to claim 6 wherein the non-linear reactant containing the divalent radical:

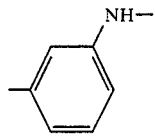

is selected from reactants of formula:

HO—R$_1$—NH$_2$,

NH$_2$—R$_2$—NH$_2$, and

HOOC—R$_3$—NH$_2$, and their polymerisable derivatives, where R$_1$, R$_2$ and R$_3$, which may be the same or different, are selected from:

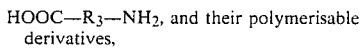, and

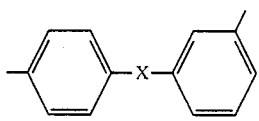

where X is a direct link or is selected from —O—, >CO, >CH$_2$, >SO$_2$, >C(CH$_3$)$_2$ or phenylene radicals, and an amino group is present in the meta position with respect to the other chain extending bond in the case of the single ring compounds and in the case of the multiple ring systems is in the meta position with respect to the outgoing bond linked to X or linked directly to the ring.

8. A method according to claim 6 wherein the non-linear —SO$_2$— containing reactants are selected from reactants of formula:

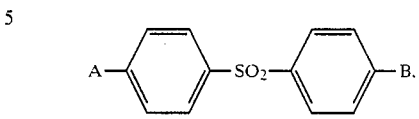

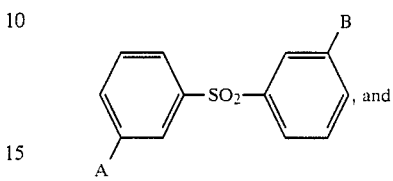, and

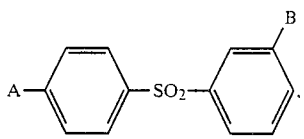.

where A and B may be the same or different and are selected from —OH, —NH$_2$, —COOH, —Q—OH, —QNH$_2$ and —Q—COOH, where Q may be a phenylene radical or a radical of formula:

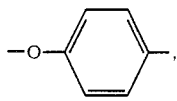,

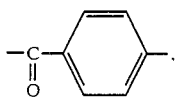,

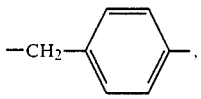,

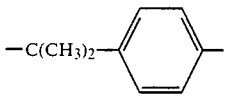

and polymerisable derivatives thereof.

9. A method according to claims 6, 7 or 8 wherein the reactants other than the non-linear reactants are selected from hydroxy aromatic acids, optionally in the presence of aromatic dicarboxylic acids and/or diphenols.

10. A method according to claims 6, 7 or 8 wherein the reactants other than the non-linear reactants are selected from aromatic dicarboxylic acids and diphenols.

11. Shaped articles having improved stiffness retention at elevated temperatures when formed from a polymer according to claim 1.

* * * * *